Feb. 9, 1937.　　　A. P. CORTESI　　　2,070,224
BICYCLE
Filed Nov. 20, 1935
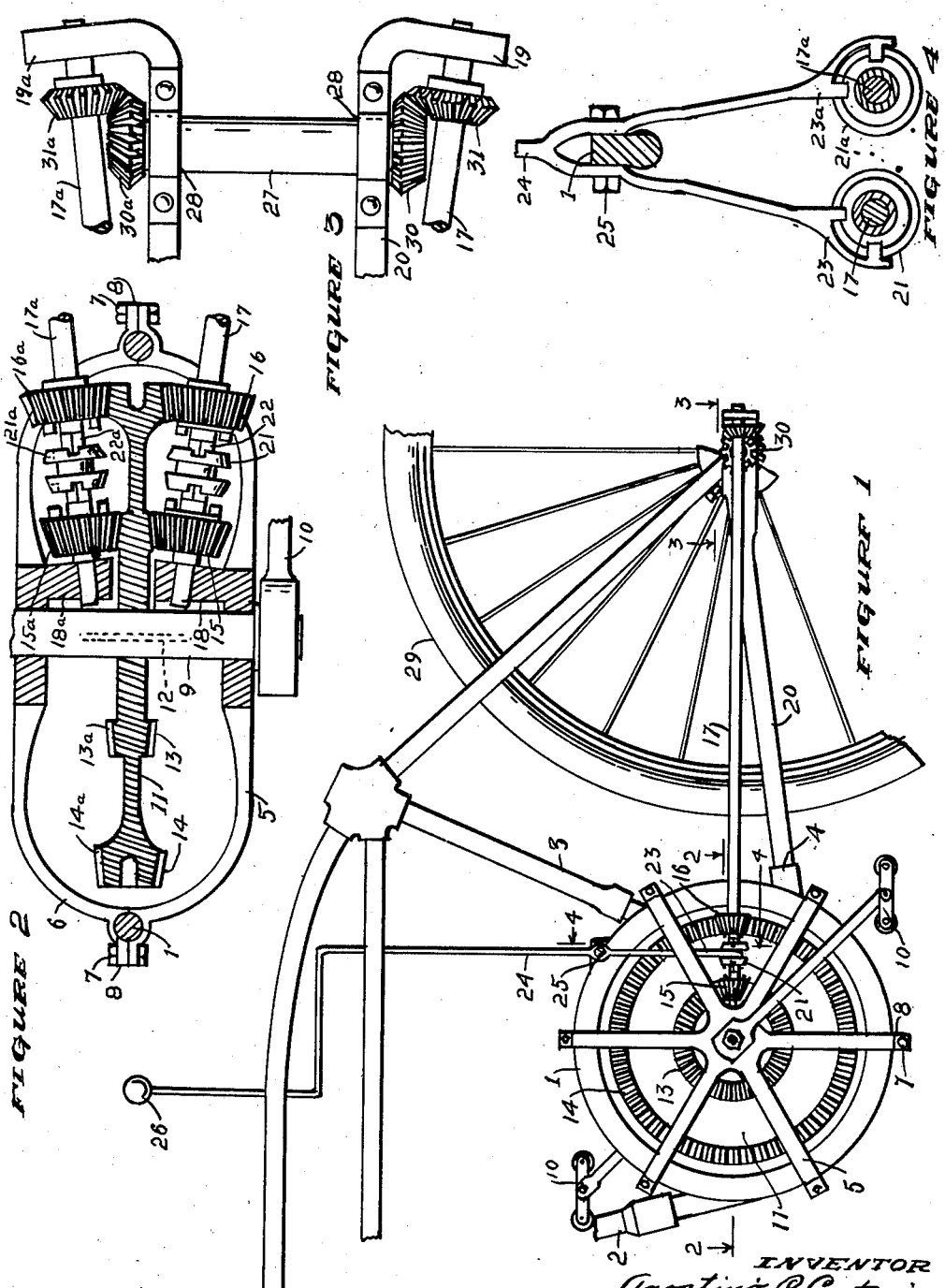

Patented Feb. 9, 1937

2,070,224

UNITED STATES PATENT OFFICE 2,070,224

BICYCLE

Agostino P. Cortesi, Reno, Nev.

Application November 20, 1935, Serial No. 50,656

1 Claim. (Cl. 208—55)

It is one object of the present invention to provide a bicycle so constructed and arranged that the velocity of its movement may be instantly changed by the rider thereof without changing the velocity of rotation of the pedals, and the gear ratio changed to conform to the necessities of the moment.

It is also an object of the invention to provide a bicycle of the character indicated that will be economical to manufacture, simple in form and construction, quickly and easily assembled or disassembled, strong, durable, and highly efficient in its practical application.

In the drawing:

Figure 1 is a side elevation of a portion of a bicycle embodying my invention.

Figure 2 is an enlarged sectional view on line 2—2 of Figure 1.

Figure 3 is an enlarged view substantially on line 3—3 of Figure 1.

Figure 4 is an enlarged view taken substantially on line 4—4 of Figure 1.

In the particular embodiment of the invention herein disclosed, I show at 1 an annular member inserted in the bicycle frame at the point where the pedals are journaled, its periphery being rigidly connected to the three co-operating bars of the frame as at 2, 3, and 4. It is to be noted that the connection 4 is disposed well below a horizontal plane passing through the axis of this member and the rear drive axle for the purpose hereinafter set forth.

At 5 and 6 are two spiders having their arms joined on member 1 by bolts 7 as shown at 8, the said spiders thereby being immovably supported relative to the member 1.

In the spiders 5 and 6 is journaled a shaft 9 operated by pedals 10 and having a gear member 11 mounted thereon between the spiders 5 and 6 and rotatable with the shaft as indicated at 12.

The gear member 11 is provided with two faces that are identical in every particular, each having two gears as 13 and 14 formed thereon in concentric relation to the axis of rotation of the member.

Meshing with the gears 13 and 14 are other gears as 15 and 16 rotatably mounted on a shaft 17. The shaft 17 is journaled in a lug 18 on spider 5 and in a laterally directed spur 19 on the rear end of fork 20. Since the shaft 17 must be on the outside of the fork 20 the fork is inclined from the rear end to the connection 4 above referred to.

Since the two sides of the member 11 are identical the two sides and parts operatively associated therewith are indicated by similar numerals, the numerals for one side having the letter "a" associated therewith.

On the shaft 17 between gears 15 and 16 is slidably mounted a grooved collar 21, this collar rotating with the shaft through the medium of the squared portion 22.

The two collars 21—21a are thrown into interlocking engagement with either gears 13—13a or gears 14—14a, or into a neutral position, by means of yokes 23a—23a engaging said collars. The yokes 23—23a are mounted on a forked lever 24 pivotally mounted on member 1 as at 25 and extending upwardly to any point where the handle 26 may be easily reached by the rider of the machine.

The rear drive shaft 27, journaled in the frame of the bicycle at 28 and carrying wheel 29, is fitted with a bevel gear on each end as at 30—30a. These bevel gears 30—30a mesh with other gears 31—31a mounted on shafts 17—17a to rotate therewith.

The result of this construction is that the operator of the bicycle may instantly shift into neutral or low or high gear as required, and the driving forces are applied equally to both ends of the drive shaft 27 with obvious advantages.

It is to be understood, of course, that while I have herein shown and described but one specific embodiment of the invention, changes in form, construction, and method of assembly and operation may be made within the scope of the appended claim.

I claim:

In a bicycle, the combination with the pedal operated axle and the rear drive wheel axle, of an annular member concentrically disposed relative to the first axle and integrant with the bicycle frame, a pair of members overlying the opposite sides of the first member and fixedly secured thereto, and in which the pedal operated axle is journaled, a pair of shafts journaled in the bicycle frame and drivingly associated with the second axle, and speed-changing mechanism operatively associated with the first axle and the said pair of shafts and disposed between the said pair of members.

AGOSTINO P. CORTESI.